S. E. OVIATT.
Improvement in Milk-Pails.

No. 130,147.            Patented Aug. 6, 1872.

Witnesses.
A. F. Cornell.
R. M. Burton

Inventor.
S. E. Oviatt.
per Burridge & Co.
Atty.

UNITED STATES PATENT OFFICE.

SOLOMON E. OVIATT, OF WEST RICHFIELD, OHIO.

IMPROVEMENT IN MILK-PAILS.

Specification forming part of Letters Patent No. 130,147, dated August 6, 1872.

SPECIFICATION.

*To all whom it may concern:*

Be it known that I, SOLOMON E. OVIATT, of West Richfield, in the county of Summit and State of Ohio, have invented a certain new and Improved Milk Stool and Pail combined; and I do hereby declare that the following is a full, clear, and complete description thereof, reference being had to the accompanying drawing making part of the same.

Figure 1:
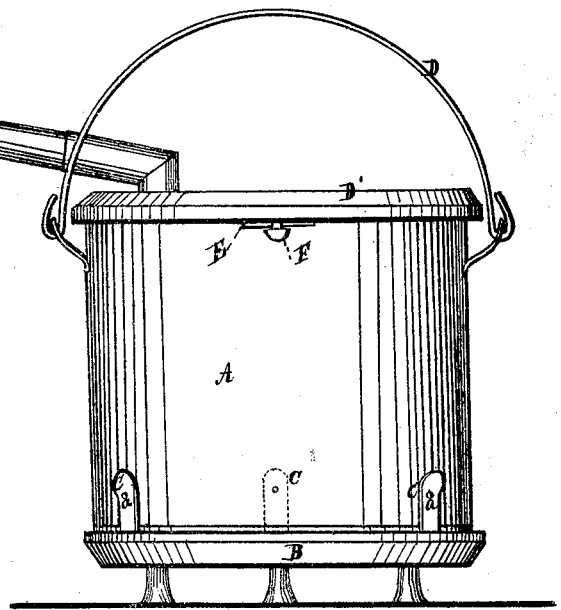
Figures 2, 3:
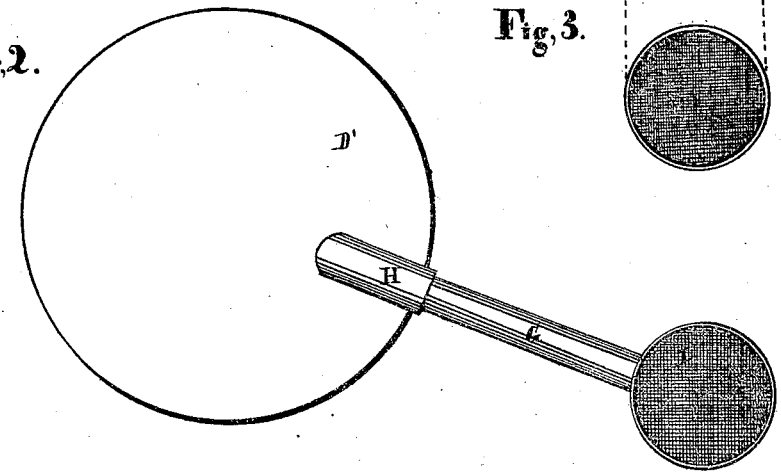

Figure 1 is a side view of the pail and stool. Fig. 2 is a top view. Fig. 3 is a detached section.

Like letters of reference refer to like parts in the several views.

The object of this invention is to combine with an ordinary milk-pail a cover and base, so that the same can be used as a seat while milking as well as for a pail for receiving the milk, the milk being conducted into the pail by an extensible tube provided with a strainer, into which the milk is drawn directly from the cow before reaching the pail.

Of the above-specified invention, the following is a more full and complete description.

In the drawing, Fig. 1, A represents the milk-pail, and B a base or stand, on which the pail is placed and secured by the ears C. Said ears are three in number, and are fixed to the face of the stool near its edge, as shown. Between said ears the pail is set, and thereto secured by pins *a* projecting from the side of the pail, and in such relation to the ears C as to slip into holes therein corresponding to the pins *a*, referred to. By this means the base is securely attached to the pail, which can be carried about therewith by the bail D. The cover D' is attached to the pail by means of a pair of inclined planes, E, and corresponding lugs F. Said planes are two in number, one on each side of the rim of the pail, one only being shown in the drawing. The lugs F depend from the under side of the cover, and on placing said cover on the pail so that said lugs shall be back of the plane, and then turning it in the direction of the incline, the lugs will be caught on the edge of the plane, and thereby draw the cover tight down upon the rim of the pail, as shown in Fig. 1, which also shows the relation of the lug to the plane when the cover is secured to the pail. Said cover serves as a seat on which to sit while milking, the milk being conveyed into the pail through the extensible tube G, one end of which is inserted in the cover, whereas the other extends out beyond it. A section of the tube H is fitted in the tube G so as to slide therein, whereby an extension of the tube can be effected, as indicated by the dotted lines *c*, for a purpose stated below. To the outer end of said tube H is secured a broad shallow funnel, I, in which is fitted a strainer, J, a detached view of which is shown in Fig. 3.

The way of using the above-described pail and stool is as follows: The milker puts the pail in such relation to the cow as he would an ordinary stool to sit on, having the tube projecting forward so as to bring the strainer near to or underneath the teats, into which he draws the milk, through which it is strained, into the funnel; thence it flows through the tube into the pail. The strainer can be adjusted in its relation of distance to the teats by moving in or out the extensible tube H; and as the tube is loose in the cover, it can be adjusted sidewise as may be required; hence the milker is not obliged to leave his seat in order to adjust the pail to the cow for receiving the milk.

By the use of this pail the milk is kept clean and free from dust or dirt that may fall from the cow. In the event the animal should step or kick the pail is out of the way; hence it is not liable to be tipped over nor stepped into by the cow.

I do not claim separately the extensible tube, funnel, and strainer above specified.

*Claim.*

The herein-described "milk stool and pail," consisting of the base B, ears C and pins *a*, pail A, cover D', tubes H G, funnel I, and strainer J, all constructed, arranged, and combined in the manner as described, and for the purpose specified.

SOLOMON E. OVIATT.

Witnesses:
W. H. BURRIDGE,
A. F. CONNELL.